Jan. 3, 1967     D. R. GARRETT ETAL     3,295,553
FUEL NOZZLE AND ADAPTER ASSEMBLY
Original Filed Nov. 21, 1960     7 Sheets-Sheet 1

INVENTORS
DOUGLAS R GARRETT
BY JAMES S MILLAR

Mason, Porter, Diller & Stewart
ATTORNEYS

Jan. 3, 1967  D. R. GARRETT ETAL  3,295,553

FUEL NOZZLE AND ADAPTER ASSEMBLY

Original Filed Nov. 21, 1960  7 Sheets-Sheet 2

INVENTORS
DOUGLAS R GARRETT
BY JAMES S MILLAR

Mason, Porter, Diller & Stewart
ATTORNEYS

Jan. 3, 1967  D. R. GARRETT ETAL  3,295,553

FUEL NOZZLE AND ADAPTER ASSEMBLY

Original Filed Nov. 21, 1960  7 Sheets-Sheet 3

INVENTORS
DOUGLAS R GARRETT
BY JAMES S MILLAR

Mason, Porter, Miller & Stewart
ATTORNEYS

Jan. 3, 1967   D. R. GARRETT ET AL   3,295,553
FUEL NOZZLE AND ADAPTER ASSEMBLY
Original Filed Nov. 21, 1960   7 Sheets-Sheet 4
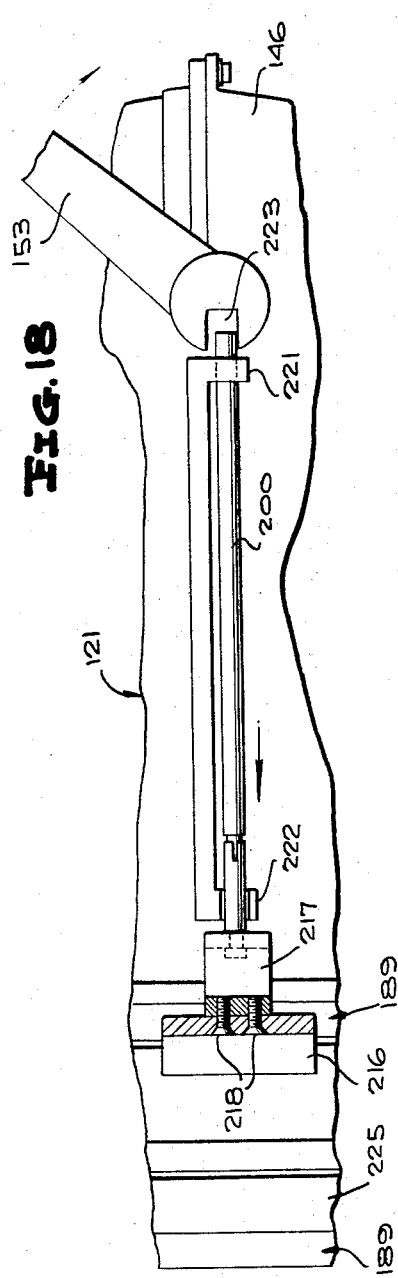
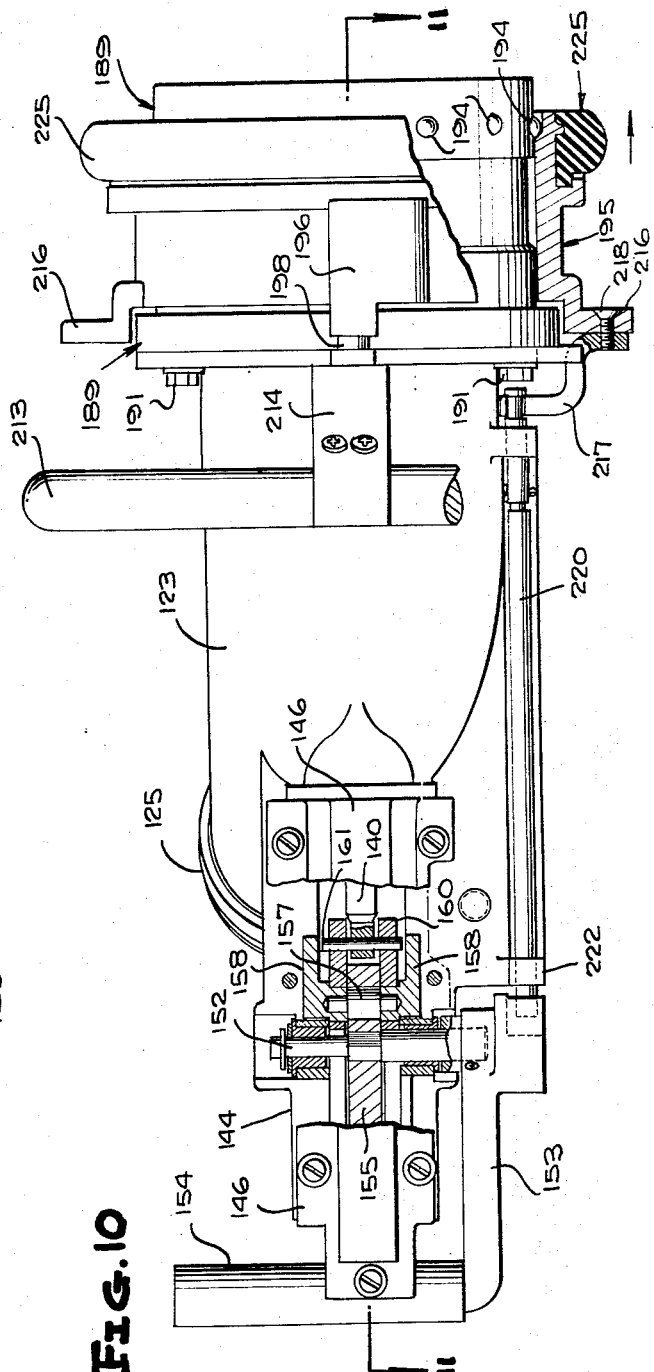
INVENTORS
DOUGLAS R GARRETT
BY JAMES S. MILLAR
Mason, Porter, Diller & Stewart
ATTORNEYS

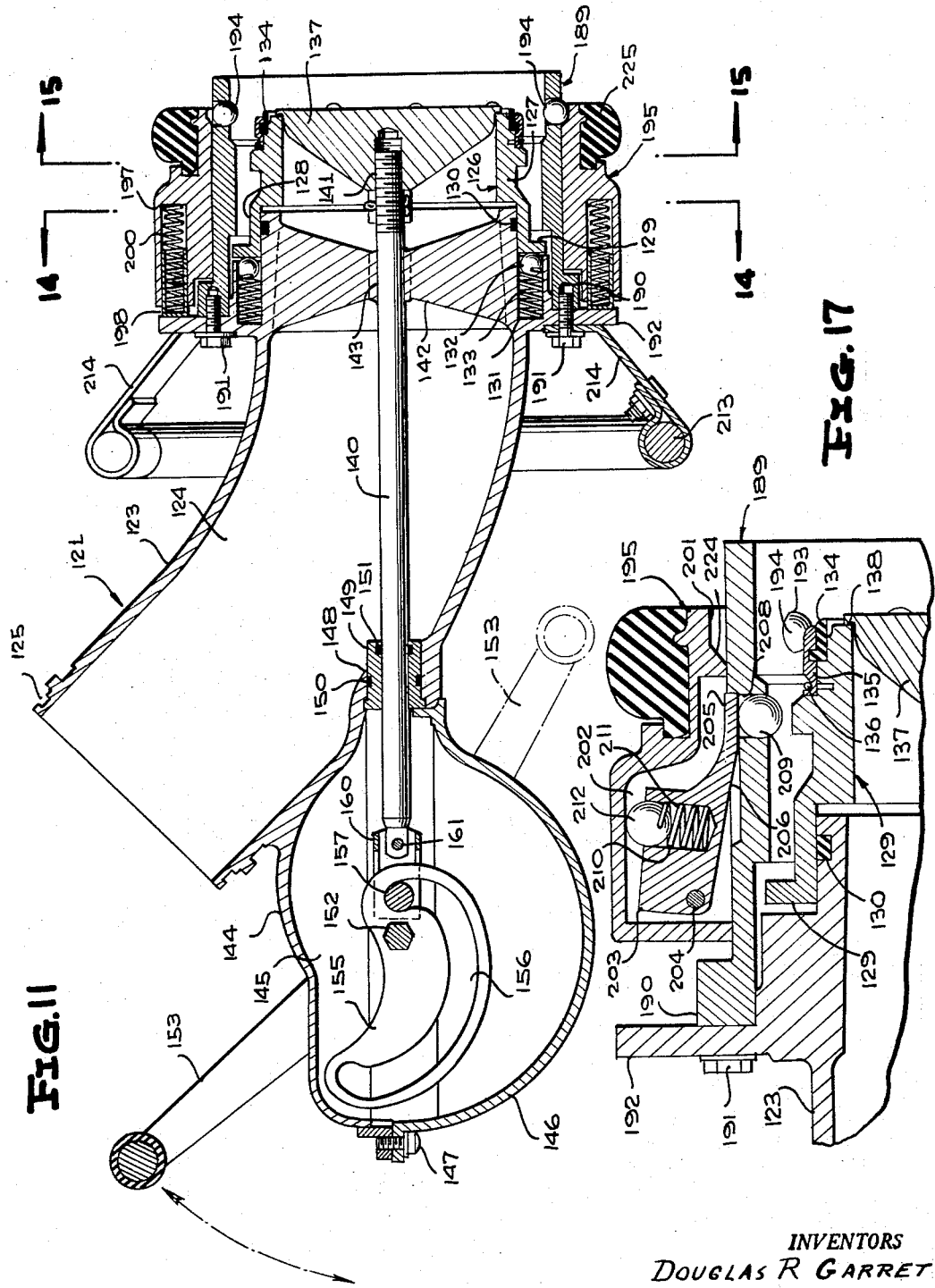

Jan. 3, 1967  D. R. GARRETT ETAL  3,295,553
FUEL NOZZLE AND ADAPTER ASSEMBLY
Original Filed Nov. 21, 1960  7 Sheets-Sheet 6

INVENTORS
DOUGLAS R GARRETT
BY JAMES S. MILLAR

Mason, Porter, Diller & Stewart
ATTORNEYS

Jan. 3, 1967 D. R. GARRETT ETAL 3,295,553
FUEL NOZZLE AND ADAPTER ASSEMBLY
Original Filed Nov. 21, 1960 7 Sheets-Sheet 7
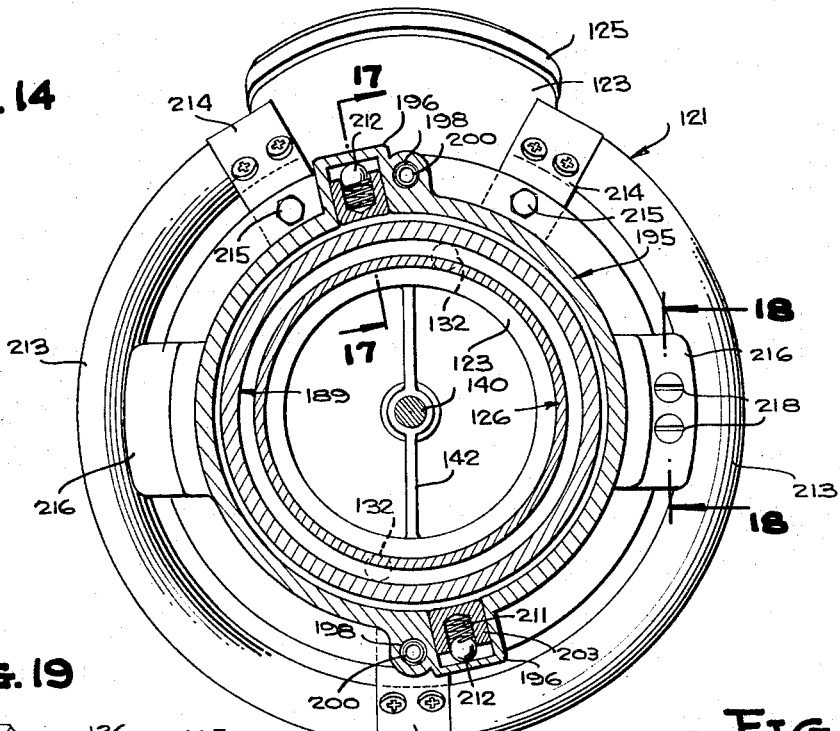
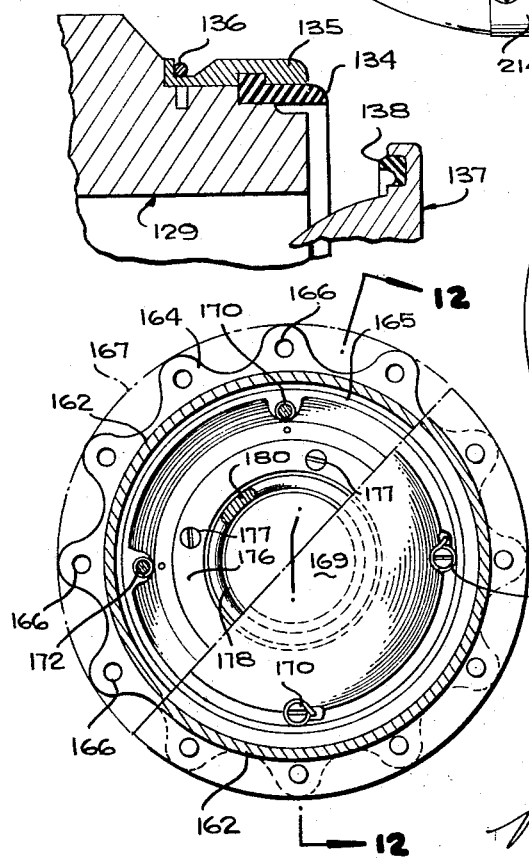
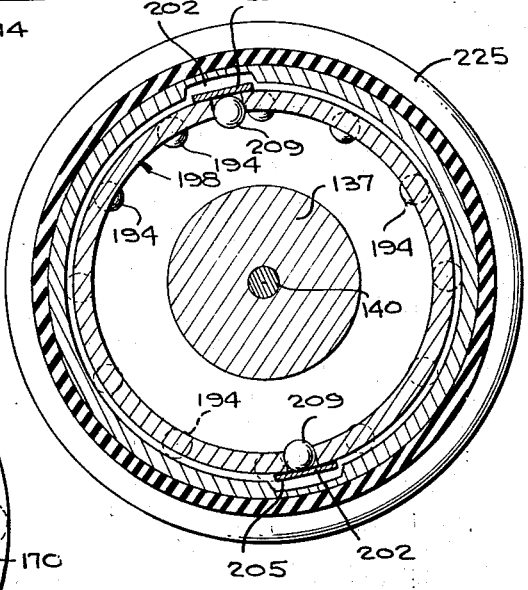
INVENTORS
DOUGLAS R GARRETT
BY JAMES S MILLAR
Mason, Porter, Diller & Stewart
ATTORNEYS

United States Patent Office 3,295,553
Patented Jan. 3, 1967

3,295,553
FUEL NOZZLE AND ADAPTER ASSEMBLY
Douglas R. Garrett and James S. Millar, Los Angeles, Calif., assignors to Parker-Hannifin Corporation, Cleveland, Ohio, a corporation of Ohio
Continuation of application Ser. No. 70,815, Nov. 21, 1960. This application Mar. 5, 1965, Ser. No. 444,887
16 Claims. (Cl. 137—614.06)

This application constitutes a continuation of our copending commonly assigned application for U.S. Letters Patent, Serial No. 70,815, filed November 21, 1960.

This invention relates in general to new and useful improvements in refueling equipment, and more particularly to a nozzle and adapter assembly of the type wherein the nozzle is readily released from the adapter.

In the high speed refueling of aircraft, there has been provided in a hydrant system wherein fuel is provided under pressure at a refueling area, and the hydrant is connected to the tank of the aircraft by means of a hose having nozzles at opposite ends thereof, the hose nozzles being readily engaged and disengaged from the hydrants whereby a hose may be transported from one hydrant to another and used for the refueling of various aircraft at different hydrant systems. This invention in particular pertains to the construction of a nozzle and the adapter for the nozzle whereby the connection between the refueling hose and either a hydrant or an aircraft tank may be readily accomplished.

In accordance with the foregoing, it is a primary object of the invention to provide a nozzle to adapter connection wherein the connection may be easily and quickly made and broken and at the same time, is of a nature wherein a tight seal is provided between the nozzle and the adapter to prevent the leakage of fuel during a refueling operation.

Another object of the invention is to provide a novel connection between a nozzle and an adapter, with the connection including a collar which is slidable relative to the nozzle and which controls the interlocking of the nozzle with the adapter, the collar also controlling the opening of a valve of a nozzle wherein the collar prevents the opening of the nozzle valve until such time as the collar is seated in a nozzle to adapter locking position and the connection between the nozzle and the valve control also preventing movement of the collar to a nozzle releasing position until such time as the nozzle valve is in a closed position.

Another object of the invention is to provide a novel nozzle and adapter assembly wherein the nozzle has an interlock with the adapter assembly to prevent the accidental disconnection thereof, the interlock between the nozzle and the adapter including a collar which prevent the releasing of the nozzle until the collar is manually withdrawn, and there being provided a connection between the collar of the nozzle and control means for a valve and nozzle wherein the valve of the nozzle cannot be opened until the collar is in a nozzle to adapter locking position and the collar cannot be withdrawn to release the nozzle until such time as the nozzle valve has been closed, and there further being provided means which prevents the movement of the collar from a retracted position to a projected nozzle locking position until such time as the nozzle is properly engaged with an adapter, thereby preventing the opening of the nozzle valve until such time as the nozzle is fully seated and interlocked relative to the adapter.

In the coupling of a nozzle to an adapter, it is absolutely necessary that a tight seal be provided between the nozzle and the adapter to prevent the leakage of fuel between the two during a refueling operation. To this end, the nozzle is generally provided with a sealing ring which engages the adapter to prevent the escape of fuel between the nozzle and the adapter. However, when the nozzle is moved relative to the adapter after the connection between the adapter and nozzle has been made, undesired twisting of the sealing ring occurs. Therefore, in accordance with this invention, it is a further object to provide a novel nozzle to adapter connection wherein the nozzle is completely connected to the adapter but not sealed relative thereto until such time as the refueling operation takes place, the sealing ring of the nozzle moving into engagement with the adapter to form a seal therewith as the valve of the nozzle is opened, thereby preventing wear on the sealing ring, which wear would result in an imperfect seal.

A difficulty encountered with the hydrant fueling system is that the refueling hose may be connected to a hydrant for a particular fuel, whereas that fuel is not intended to be placed into the tanks of the particular aircraft, various aircraft utilizing different fuels. Difficulty is encountered when the person refueling the aircraft either does not know the type of fuel to be supplied to the aircraft or has erroneously connected the refueling hose to the wrong hydrant. It is therefore a still further object of the invention to provide a refueling nozzle and adapter assembly having selector means whereby a nozzle intended to dispense a specific fuel can be coupled to only a specific adapter. In this manner, when an aircraft tank is provided with a portion of the selector, only a hose having a nozzle with a matching part of the selector can be coupled to the aircraft tank. By the same token, if the same type of selector is placed on the nozzle at the opposite end of the hose, the hose can be only connected to a proper hydrant. In this manner, it is impossible for a person refueling an aircraft to place the wrong fuel in the tank of the aircraft.

With the above, and other objects in view that will hereinafter appear, the nature of the invention will be more clearly understood by reference to the following detailed description, the appended claims and the several views illustrated in the accompanying drawings:

In the drawings:

FIGURE 10 is a bottom view of another form of nozzle with portions thereof broken away and shown in section to illustrate the details of mounting of a control handle for the valve of the nozzle.

FIGURE 11 is a vertical sectional view taken along the line 11—11 of FIGURE 10, and shows the specific details of construction of the nozzle, including the details of means for opening the valve thereof.

FIGURE 14 is a transverse vertical sectional view taken along the line 14—14 of FIGURE 11, and shows details of construction of the nozzle.

FIGURE 15 is a transverse vertical sectional view taken along the line 15—15 of FIGURE 11 and shows further the details of construction of the nozzle.

FIGURE 16 is a transverse sectional view taken along the line 16—16 of FIGURE 12, and shows the details of the adapter.

FIGURE 17 is an enlarged fragmentary vertical sectional view taken along the line 17—17 of FIGURE 14, and shows the specific details of the collar for assuring the coupling of the nozzle to the adapter.

FIGURE 18 is a fragmentary sectional view taken along the line 18—18 of FIGURE 14, and showing the details of the interlock between the coupling assuring collar of the nozzle and the valve control handle to prevent the operation of the valve control handle when the collar is not in a nozzle coupling position.

FIGURE 19 is an enlarged fragmentary sectional view showing the details of the nozzle including the details of the sealing ring thereof and the valve thereof.

Figure 1:
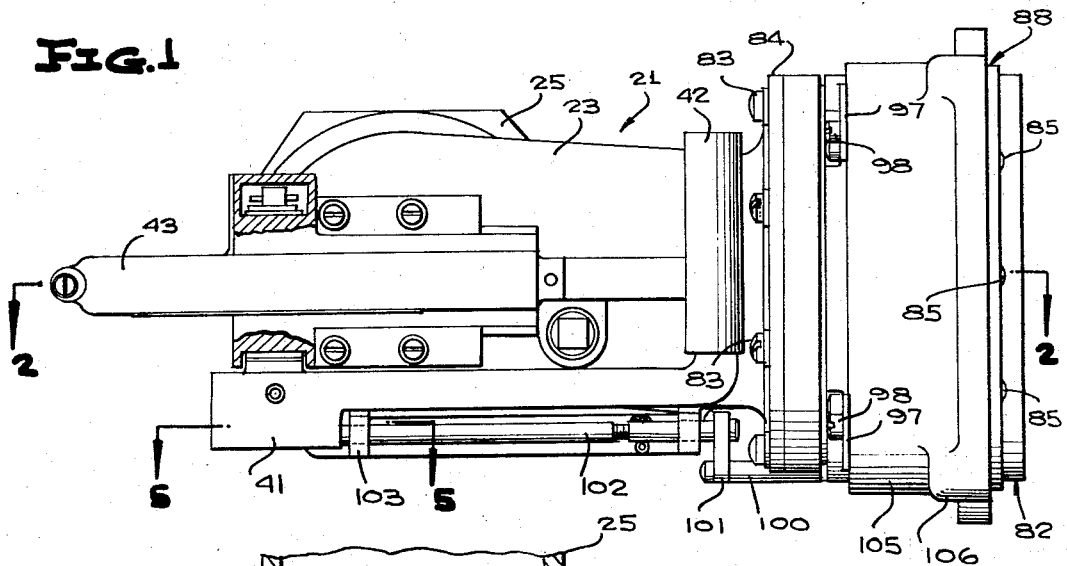
FIGURE 1 is a bottom view of a first form of nozzle formed in accordance with this invention and shows the general details thereof, including the mounting of a control handle for the valve of the nozzle.

Reference is now made to FIGURES 1 through 9 of the drawings wherein a first form of the invention is illustrated. The assembly includes a nozzle, generally referred to by the numeral 21, and an adapter, generally referred to by the numeral 22. The nozzle 21 includes a body 23 which has a generally L-shaped fuel passage 24 therethrough. One end of the fuel passage 24 terminates in a fitting 25 to which a fueling hose (not shown) may be connected. The opposite end of the fuel passage 24 is normally closed by a valve member 26. The valve member 26 has a sealing ring 27 to assure against the accidental escape of fuel through the fuel passage 24.

The valve member 26 is carried by a valve rod 28 which is secured to the valve member 26 in any desired manner. The valve rod 28 extends through a sleeve 29 seated in the nozzle body 23 in a bore 30 which opens rearwardly into a cavity 31 formed in the lower central rear portion of the nozzle body 23. The sleeve 29 is secured in place by means of a setscrew 32 and is provided with a sealing ring 33 which seals it to the nozzle body 23. The sleeve 29 is also provided with a sealing ring 34 which forms a seal between the valve rod 28 and the sleeve 29.

Figure 2:
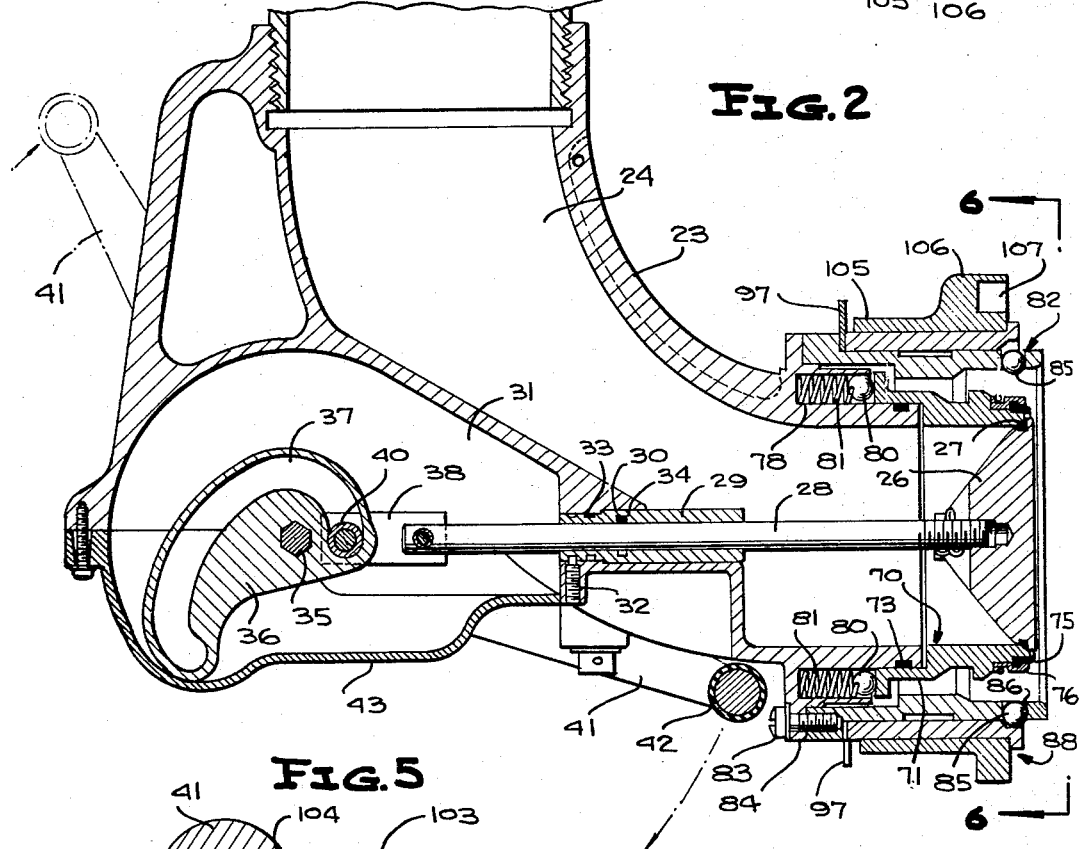
FIGURE 2 is a fragmentary vertical sectional view taken along the line 2—2 of FIGURE 1, and shows the specific details of construction of the nozzle including the means for controlling the position of the valve of the nozzle.

A shaft 35 is suitably rotatably journaled in the lower portion of the nozzle body 23 in the manner generally illustrated in FIGURE 1, the shaft 35 bridging the cavity 31. The shaft 35 carries a cam member 36 which has a cam track 37 formed therein. A fitting 38 secured to the rear or left end of the valve rod 28 is provided with a roller 40 which is engaged in the cam track 37. It will be apparent that when the cam 36 is rotated in a clockwise direction, as shown in FIGURE 2, the valve rod 28 will be moved to the right to move the valve member 26 to an unseated position whereby fuel may flow through the fuel passage 24. The shaft 35 has a crank 41 secured thereto, with the crank 41 carrying a handle 42 to facilitate the rotation of the shaft 35. The cam 36 is disposed within the cavity 31, and the lower portion of the cavity 31 is closed by a removable cover 43.

Figure 3:
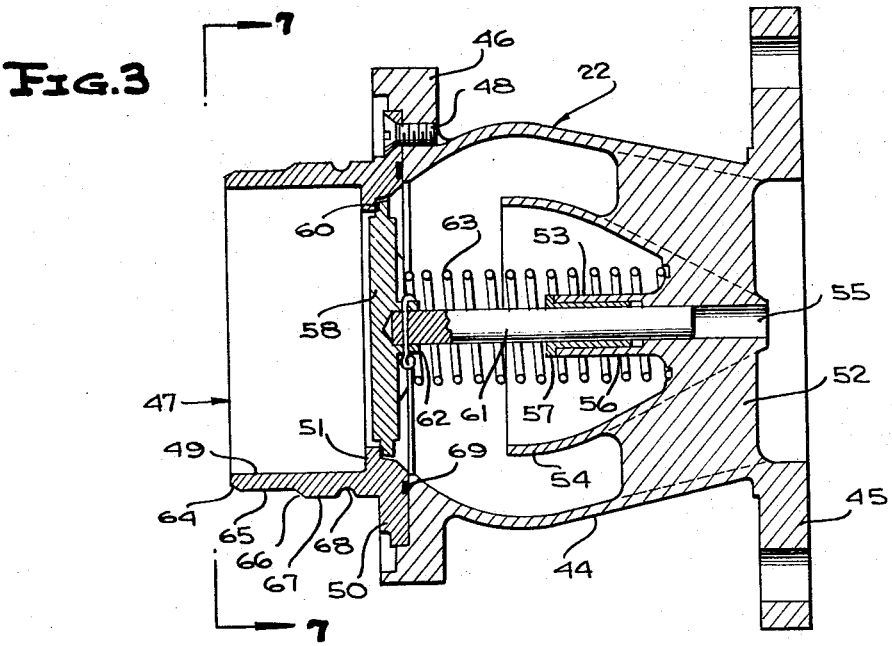
FIGURE 3 is a vertical sectional view taken through an adapter which is intended to be coupled to the nozzle.

Referring now to FIGURE 3 in particular, it will be seen that the adapter 22 includes an adapter body 44 which is provided at one end thereof with a flange 45 which is utilized for the purpose of coupling the adapter 22 to either a hydrant or a tank. The adapter body 44 also terminates at the left end thereof, as viewed in FIGURE 3, in a flange 46. A coupling sleeve, generally referred to by the numeral 47, is secured to and seated in the flange 46 by means of circumferentially spaced fasteners 48. The coupling collar 47 includes a sleeve portion 49 and a flange 50, the fasteners 48 passing through the flange 50 and clamping the same against the flange 46. The coupling collar 47 also includes an inwardly directed annular flange 51 which functions as a valve seat.

The adapter body 44 is provided adjacent the flange 45 with a spider 52 which supports a sleeve 53. The spider 52 also supports a fuel flow directing cone 54. The sleeve 53 has a bore 55 therethrough with the bore 55 being of an increased diameter, as at 56, adjacent the left end of the bore 55. A suitable bushing 57 is seated in the enlarged portion 56 of the bore 55.

The adapter 22 also includes a valve member 58 which has a sealing ring 60 engageable with the valve seat 51 to close the adapter 22 against flow of fuel therethrough. The valve member 58 is carried by a valve rod 61 which is freely slidable in the bore 55 and in the bushing 57. The valve rod 61 is suitably connected to the valve member 58, as at 62. A coil spring 63 is telescoped over the valve rod 61 and the sleeve 53 and bears against the spider 52 at the right end thereof. The left end of the spring 63 bears against the valve member 58 and continuously urges the valve member 58 towards the valve seat 51.

The sleeve portion 49 of the collar 47 has a specific external configuration. It is to be understood that the sleeve 49 is of a circular cross-section throughout. The external surface has a first ramp or cam portion 64 at the left end thereof. The exterior of the sleeve 49 is then straight, as at 65, and then, there is a second ramp or cam portion 66. Following the cam portion 66, the exterior of the sleeve 49 is straight, as at 67, and then is provided with an annular recess 68 into which connecting members, such as balls, may be seated. At this time, it is pointed out that the flange 50 is sealed with respect to the adapter body 44 by means of a sealing ring 69.

Figure 8:
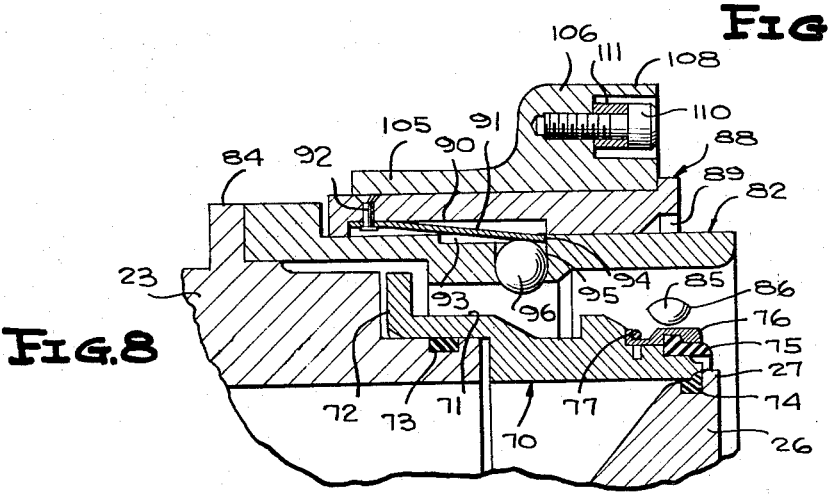
FIGURE 8 is an enlarged fragmentary vertical sectional view taken along the line 8—8 of FIGURE 6, and shows the details of interlock means for preventing the movement of a coupling assuring collar of the nozzle until such time as the nozzle is in an adapter coupling position.
Figure 9:
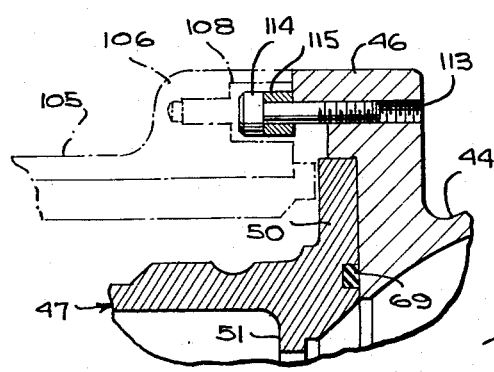
FIGURE 9 is an enlarged fragmentary vertical sectional view taken along the line 9—9 of FIGURE 7 and shows the specific details of the selector ring interlock, the selector ring of the nozzle being shown in phantom lines.

Reference is now made to FIGURES 2 and 8 wherein it will be seen that the nozzle body 23 has a separate nose, generally referred to by the numeral 70. The nose 70 is in the form of a cylindrical sleeve having a forward portion aligned with the corresponding part of the nozzle body 23. The rear portion of the nose 70 is offset, as at 71, and is telescoped over the forward end of the nozzle body 23. The nose 70 terminates at its rear end in an outwardly directed circumferential flange 72. The rear portion of the nose 70 which is telescoped over the forward end of the nozzle body 23 is sealed relative thereto by means of a sealing ring 73.

Figure 4:
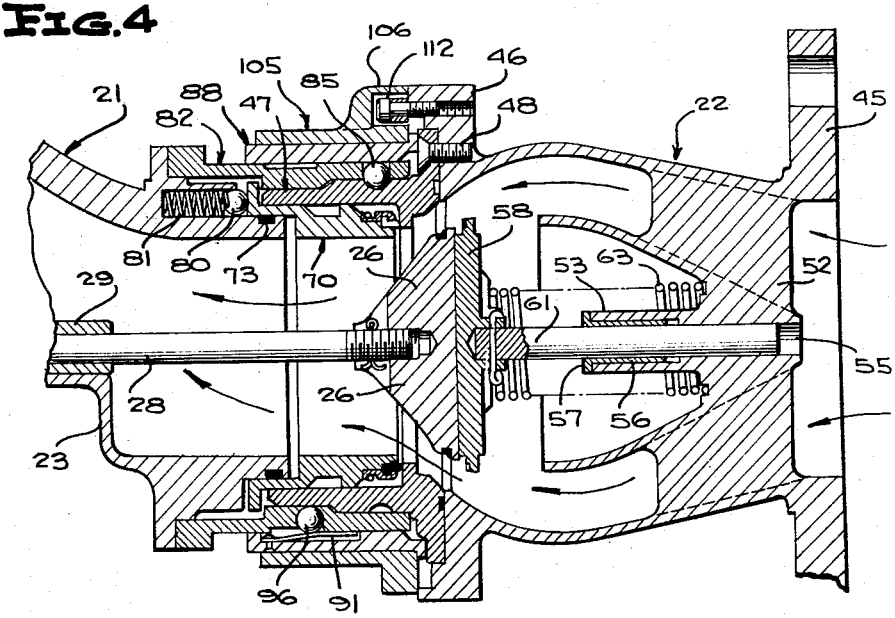
FIGURE 4 is a fragmentary vertical sectional view showing the nozzle coupled to the adapter, and the valve of the nozzle in an open position for flow of fuel through the adapter into the nozzle.

It is to be noted that the forward end of the nose 70 is provided with an inner valve seat 74 for engagement by the sealing ring 27 of the valve member 26. It is also to be noted that the outer portion of the forward end of the nose 70 carries a sealing ring 75 which is held in place by a retainer 76 which, in turn, is held in place by a snap ring 77. The sealing ring 75, as is best illustrated in FIGURE 4, is intended to engage the valve seat 51 of the collar 47 to form a seal between the nozzle 21 and the adapter 22.

The forward part of the nozzle body 23 is provided with longitudinal bores 78 in which balls 80 are disposed the balls 80 being urged forward or to the right, as viewed in FIGURES 2 and 8, by springs 81 disposed within the bores 78. The balls 80 bear against the flange 72 of the nose 70 and urge the nose 70 to the right.

A body extension, generally referred to by the numeral 82, is disposed outwardly of the nose 70 and the forward end of the nozzle body 23. The body extension 82 is fixedly secured to the forward end of the nozzle body 23 by means of circumferentially spaced fasteners 83 extending through an outwardly directed annular flange 84 formed on the forward part of the nozzle body 23. This connection is best illustrated in FIGURE 2. The body extension 82 is provided adjacent the forward end thereof with a first set of circumferentially spaced balls 85 which are mounted in sockets configurated to restrict the inward movement of the balls 85 so that the balls 85 cannot move inwardly through the sockets 86 and thus be lost. The balls 85 are intended to be seated on the recess 68 in the collar 47 to lock the nozzle 21 in a fixed position with respect to the adapter 22. The body extension 82 also includes an internal annular abutment 79 in axially opposed relationship to the flange 72 of the nose 70 for preventing the separation of the nose 70 from the nozzle body 23 under the biasing forces of the springs 81 when the valve 26 is open.

Referring once again to FIGURES 2 and 8 in particular, it will be seen that a coupling assuring sleeve or collar, generally referred to by the numeral 88, is disposed about the body extension 82. The sleeve 88 has an inner recessed forward portion 89 in which the outer portions of the balls 85 are received when the nozzle 21 is separate from the adapter 22. The sleeve 88 serves to retain the balls 85 in their inwardly projected positions when the nozzle 21 is connected to the adapter 22.

The sleeve 88 is provided with a pair of circumferentially spaced internal recesses 90 in which there are seated spring retainer members 91 which are secured to the sleeve 88 by means of rivets 92. The body extension 82 is provided with an external recess 93 aligned with each recess 90 and overlapping the forward portion thereof. This results in the formation of a shoulder 94 behind which the associated spring 91 engages and prevents the forward movement of the sleeve 88 to the right, as viewed in FIGURE 8. A socket 95 opens through the body extension 82 at the forward end of each recess 93. The socket 95 carries a ball 96 which bears against the spring 91 and which projects inwardly through the body extension 82. When the ball 96 is moved outwardly, its associated spring retainer member 91 is sprung outwardly so as to clear the shoulder 94 so that the sleeve 88 may be moved to the right. In order to facilitate the manual retraction of the sleeve 88 to the left, a plurality of circumferentially spaced grip members 97 are secured to the rear portion of the sleeve 88 by means of fasteners 98, as is best shown in FIGURES 1 and 2.

Figure 5:
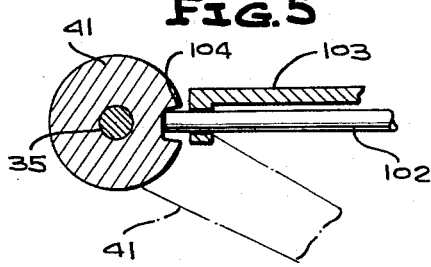
FIGURE 5 is a fragmentary sectional view taken along the line 5—5 of FIGURE 1, and shows the details of the interlock for preventing the rotation of the valve control handle of the nozzle to an open position at such time as the nozzle is not connected to the adapter.

Reference is now made to FIGURES 1 and 5, wherein it is shown that the sleeve 88 is provided with a rearwardly extending rod 100 to which there is connected a fitting 101. The fitting 101, in turn, has connected thereto a rod 102 which is sectional and adjustable in length. The rear part of the rod 102 is supported for sliding movement by means of a bracket 103 in the manner best illustrated in FIGURE 5. The crank 41 has a notch 104 formed therein for receiving the rear end of the rod 102. Thus, when the sleeve 88 is in its normal retracted position, the rod 102 is seated in the notch 104 and prevents rotation of the crank 41 to a position wherein the valve member 26 will be moved to an open position. Thus, until such time as the sleeve 88 is moved to the right, the valve member 26 cannot be moved to an open position. Movement of the sleeve 88 to the right is prevented by the spring retainer members 91 until such time as the nozzle 21 is in a position to be coupled to the adapter 22. It will also be apparent that the sleeve 88 cannot be returned to its position of FIGURES 2 and 8 until such time as the crank 41 has been swung to a valve closing position.

Reference is now made to FIGURE 4, wherein the nozzle 21 is illustrated as being coupled to the adapter 22. It is to be noted that in the coupled position of the nozzle 21 and the adapter 22, the balls 85 are seated in the groove 68 and that outward movement of the balls 85 is prevented by the sleeve 88 which is in a forwardly projected position. It is also to be noted that the balls 96 have ridden up on the flat portion 65 of the collar 47 and hold the spring retainer members 91 in their outwardly disposed sleeve releasing positions. The valve member 26 has engaged the valve member 58 and the two have moved to the right to a partially opened position. It is to be noted that the valve member 26 serves as the means for opening the valve member 58.

In assembling the nozzle 21 and the adapter 22, the nozzle 21 is moved relative to the adapter 22 after the two have been aligned. The balls 85 first ride up over the cam 64 onto the flat portion 65. Further telescoping of the nozzle 21 and the adapter 22 results in the balls 85 riding up on the cam 66 and onto the flat portion 67. As the balls 85 ride up onto the flat portion 67, the balls 96 ride up on the cam 64 and onto the flat portion 65 so as to move the spring retainer members 91 to positions where they release the sleeve 88. The sleeve 88 can still not be moved to the right since the balls 85 are disposed outermost due to their engagement with the flat portion 67. However, further telescoping movement of the nozzle 21 relative to the adapter 22 will result in the alignment of the balls 85 with the groove 68 so that the balls 85 may seat in the groove 68. The sleeve 88 may then be moved to the right and in this position, illustrated in FIGURE 4, serves to prevent the outward movement of the balls 85, thereby retaining the balls 85 in the recess 68 and effecting the locking of the nozzle 21 to the adapter 22.

At this time, it is pointed out that when the nozzle 21 is initially engaged with the adapter 22, the sealing ring 75 is closely adjacent to, but spaced from the valve seat 51 of the collar 47. This permits the nozzle 21 to swivel relative to the adapter 22 without any scuffing or wearing of the sealing ring 75. When the hose of which the nozzle 21 is a part is finally settled and the fueling operation is about to commence, the valve member 26 may be moved to its open position utilizing the crank 41. As the valve member 26 moves to the right, the springs 81 react on the nose 70 and move it to the right to spring urge the sealing ring 75 into engagement with the valve seat 51 and thus form the desired seal between the nozzle 21 and the adapter 22, the seal being accomplished after the movement of the nozzle 21 relative to the adapter 22 has been discontinued, thereby preventing any wearing or scuffing of the sealing ring 75.

When the fueling operation has terminated, the sleeve 88 cannot be withdrawn to the left to release the nozzle 21 until the valve member 26 has been moved back to its nozzle sealing position through the actuation of the crank 41 because of the interlock between the rod 102 and the crank 41 described above. As the valve member 26 moves from right to left, as viewed in FIGURE 4, the spring loading of the valve member 58 results in the valve member 58 moving towards the valve seat 51 and in engagement therewith prior to the seating of the sealing ring 27 and the valve member 26 on the valve seat 74 formed on the nose 70. As the valve member 26 is further retracted, the nose 70 is moved rearwardly so that the sealing ring 75 will move out of engagement with the valve seat 51. The sleeve 88 may then be retracted and the nozzle 21 removed from the adapter 22.

Figure 6:
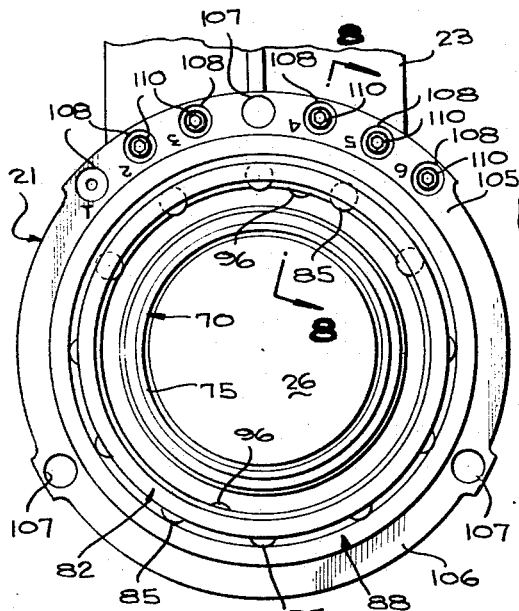
FIGURE 6 is an elevational view taken along the line 6—6 of FIGURE 2, and shows the details of the end of the nozzle to be coupled to the adapter, including the details of a selector ring.
Figure 7:
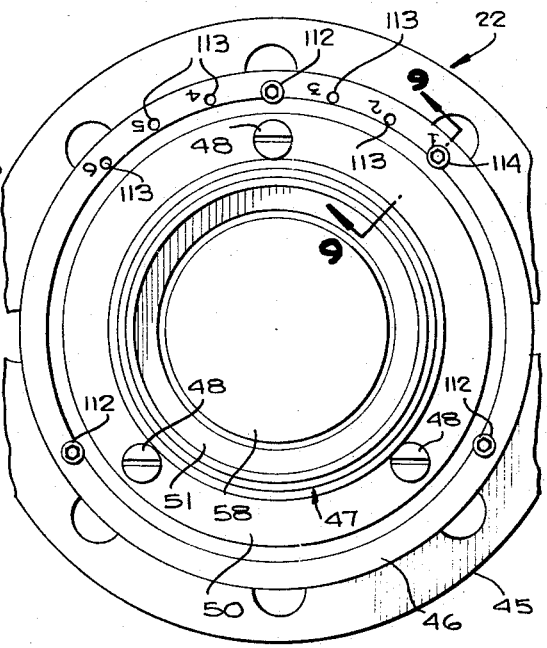
FIGURE 7 is an elevational view taken along the line 7—7 of FIGURE 3, and shows the detail of the end of the adapter to be connected to the nozzle, including the details of the selector ring carried thereby.

Reference is now made to FIGURES 6, 7 and 8, wherein the details of means for assuring the proper coupling of a nozzle to the correct adapter are illustrated.

The nozzle 21 is provided with a selector ring 105 which is mounted on the sleeve 88, as is best shown in FIGURE 8. The selector ring 105 has a relatively thick flange 106 disposed at the right end thereof. The flange 106 is provided with a set of three bores 107 which are spaced generally equidistant apart, although the pattern of the bores 107 could be varied if desired. In addition to the bores 107, the selector ring 105 is provided with six other bores 108, three of the bores 108 being disposed on one side of the uppermost ones of the bores 107 and the other three of the bores 108 being disposed on the other side of the uppermost bore 107, as is best shown in FIGURE 6. The bores 108 are numbered on the face of the adapter ring 105. As is best shown in FIGURE 6, each of the bores 108 is provided with a reduced threaded extension 109 for the reception of a bolt 110, the bolt 110 normally carrying a sleeve 111 so that the head of the bolt 110 is disposed generally flush with the end or face of the selector ring 105. It is intended that each of the bores 108 with the exception of one has a bolt 110 therein. Thus, only one of the bores 108 is available to receive a pin in a manner to be described hereinafter.

The adapter 22 is also provided with a selector ring arrangement, the flange 46 forming the selector ring. The flange 46 is provided with three pins 112 in the form of cap screws which have the heads thereof projecting to the left of the flange 46 for engagement in the bores 107.

The flange 46 has a plurality of threaded bores 113 which are spaced on opposite sides of the uppermost pin 112. The bores 113 selectively receive a pin 114 which, like the pins 112, is in the form of a cap screw. Each pin 114 also carries a sleeve 115, as does each of the pins 112. The bores 113 are numbered in accordance with the sockets 108 in the selector ring 105. It is to be noted that the pin 114 appears in the bore 113 which is aligned with the socket 108 in which there is no pin 110. Thus, the nozzle 21 can be coupled to the adapter 22. On the other hand, should the position of the pin 114 not match the empty one of the sockets 108, then, the nozzle 21 could not be moved sufficiently over the adapter 22 to effect the necessary coupling. In this manner, the proper fuel for the proper tank is assured.

Reference is now made to FIGURES 10 through 20 of the drawings, wherein a modified nozzle and adapter assembly is illustrated. The assembly includes a nozzle, generally referred to by the numeral 121, and an adapter, generally referred to by the numeral 122.

The nozzle 121, as is best illustrated in FIGURE 11, includes a nozzle body 123 having a curved flow passage 124 therethrough. The upper or left end of the nozzle body 123 is provided with means, as at 125, to facilitate the connection of a hose thereto.

The forward or right end of the nozzle body 123 is provided with a nose, generally refered to by the numeral 126. The nose 126 has a forward portion 127 with an interior surface corresponding generally to the interior surface of the forward part of the nozzle body 123. The rear portion of the nose 126 is outwardly offset, as at 128, and is telescoped over the forward portion of the nozzle body 123. The rear portion 128 terminates in an outwardly directed flange 129. The rear portion of the nose 126 is sealed to the nozzle body 123 by means of a sealing ring 130.

The forward portion of the nozzle body 123 is provided with a pair of bores 131 in which there are seated balls 132. Each bore 131 also has a spring 133 therein bearing against the respective ball 132 and urging the ball 132 to the right and into engagement with the flange 129. Thus, the nose 126 is spring loaded for movement to the right.

As is best shown in FIGURE 17, the nose 126 carries on the outer forward part thereof a projecting sealing ring 134 whose purpose will be described hereinafter. The sealing ring 134 is held in place on the nose 126 by a retainer 135 which is, in turn, held in place by a ring 136.

The forward or right end of the flow passage 124 is normally closed by a valve member 137 which has a sealing ring 138 disposed in engagement with the forward inner corner of the nose 126, as is best shown in FIGURE 17. As is best shown in FIGURE 11, the valve member 137 is carried at the forward end of a valve rod 140 and is suitably secured thereto, as at 141. The forward portion of the valve rod 140 is supported by a spider 142 formed as a part of the valve body 123 and having a bore 143 through which the valve rod 140 slides.

The valve body 123 has a rearwardly projecting, centrally located housing portion 144 which defines a cavity 145. The housing portion 144 has removably secured thereto a cover 146, the cover 146 being secured in place by suitable fasteners 147. The cover 146 cooperates with the housing portion 144 in defining the cavity 145.

The nozzle body 123 has a sleeve portion 148 disposed between the cavity 145 and the fuel passage 124. The sleeve 148 is closed by a bushing 149 which is sealed to the nozzle body 123 by a sealing ring 150. The bushing 149 is also sealed to the valve rod 140 by a sealing ring 151. The bushing 149 is retained in the sleeve 148 by the cover 146.

As is best shown in FIGURES 10 and 11, a shaft 152 extends transversely through the cavity 145 and is suitably journaled for rotation within the housing portion 144 of the nozzle body 123. A crank 153 is secured to one end of the shaft 152 for manually rotating the same. The crank 153 includes a handle or grip portion 154.

A cam 155 is carried by the center part of the shaft 152 and within the cavity 145, as is best shown in FIGURE 11. The cam 155 has a cam track 156 in which a follower 157 is mounted. As is best shown in FIGURE 10, the follower 157 has the ends thereof journaled in bearing members 158 carried by the clevis 160. The clevis 160 is connected to the rear end of the valve rod 140 by means of a pin 161. It will be readily apparent upon viewing FIGURE 11 that when the crank 153 is swung downwardly in a counterclockwise direction, the cam 155 will be so rotated that the valve rod 140 will move from left to right and thus move the valve member 137 to a position opening the forward or right end of the flow passage 124.

Figure 12:
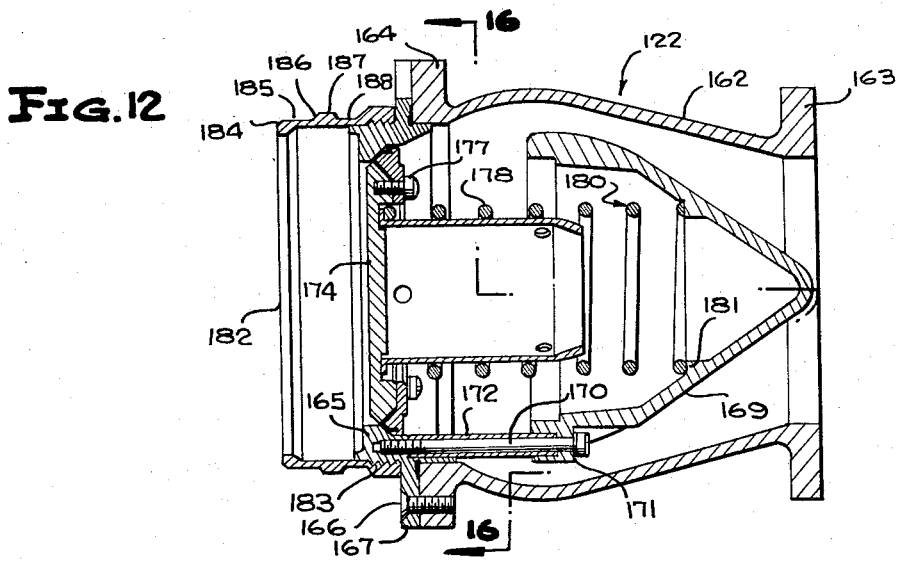
FIGURE 12 is a vertical sectional view taken along line 12—12 of FIGURE 16, and shows the specific details of an adapter to which the nozzle is to be coupled.

Reference is now made to FIGURES 12 and 16, wherein the details of the adapter 122 are illustrated. The adapter 122 includes an adapter body 162 having a mounting flange 163 at the right end thereof, as viewed in FIGURE 12. The mounting flange 163 may be connected either to a hydrant or to a tank. The adapter body 162 is provided at the left end thereof with a second flange 164.

Figure 20:
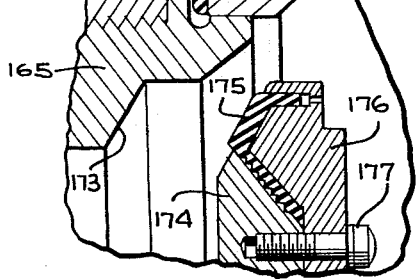
FIGURE 20 is an enlarged fragmentary sectional view showing the specific details of sealing means of the adapter.

A ring 165 is disposed adjacent the flange 164 and is secured to the flange 164 by a plurality of fasteners 166 which are threaded into circumferentially spaced projecting portions of the flange 164, as is best shown in FIGURES 12 and 16. The ring 165 has a flange portion 167 which opposes the flange 164 and is sealed relative thereto by means of a sealing ring or gasket 168, as is best shown in FIGURE 20.

A shroud 169 is centered within the adapter body 162 and is supported by a plurality of elongated bolts 170. The bolts 170 pass through the flange portions 171 of the shroud 169 and are retained into the ring 165, as is best shown in FIGURE 12. The bolts 170 carry elongated sleeves 172 which function as spacers and support the shroud 169 in spaced relation with respect to the ring 165.

The ring 165 has an inwardly projecting portion defining a valve seat 173. The valve seat 173 has associated therewith a valve member 174. The valve member 174, as is best illustrated in FIGURE 20, carries a sealing ring 175 which is held in place by a clamping ring 176 which, in turn, is secured to the valve member 174 by a plurality of fasteners 177.

A tubular guide member 178 projects to the right from the rear or right side of the valve member 175. The guide member 178 projects slightly into the shroud 169 and is held in place on the valve member 174 by a large diameter coil spring 180 which surrounds the guide member 178. The coil spring 180 bears against a shoulder 181 formed in the rear interior portion of the shroud 169. Since the shroud 169 is fixed against movement, the spring 180 resists unseating movement of the valve member 174 to the right.

The adapter member 122 also includes a connecting sleeve or collar 182. The sleeve 182 is threaded on to the left part of the ring 174, as at 183. The sleeve 182 is of a circular cross-section and includes a left sloping or cam portion 184 which terminates at its right edge in a flat portion 185. The flat portion 185 leads into a second sloping or cam portion 186 which, in turn, terminates in a narrow flat portion 187. A recess or groove 188 is disposed to the right of the flat portion 187.

Reference is again made to FIGURE 11 wherein it is shown that the nozzle body 123 has an extension, generally referred to by the numeral 189. The extension 189 has an enlarged rear portion 190 into which there is threaded a plurality of bolts 191 which pass through an outwardly projecting flange 192 of the nozzle body 123.

The forward portion of the extension 189 is provided with a plurality of circumferentially spaced sockets 193 in which there are received balls 194. The sockets 193 are so shaped that the inward movement of the balls 194 is restricted. The balls 194 are intended to be seated in the groove 188 and to lock the nozzle 121 to the adapter 122. The nozzle body 123 also includes an internal annular abutment 179 in axially opposed relationship to the flange 129 of the nose 126 for preventing the separation of the nose 126 from the nozzle body 123 under the biasing forces of the springs 133 when the valve 26 is open.

A connection assuring sleeve or collar 195 is carried by the extension 189 for longitudinal sliding movement. The sleeve 195 is provided with two enlargements 196 on the rear portion thereof. In each of these enlargements there is formed a rearwardly opening bore 197 in which there is positioned a pressure exerting tubular member 198. A coil spring 200 is also disposed in each bore 197 and has the left end thereof received in the member 198. The member 198 bears against the flange 192 and serves to urge the sleeve 195 to the right to its coupling assuring position.

The inner right portion of the sleeve 195 is recessed, as at 201. The balls 194 are aligned with the recessed portion 201 and certain of the balls 194 normally engage the sleeve 195 in the recessed portion 201 to prevent movement of the sleeve 195 to the right.

As is best shown in FIGURE 17, each of the enlargements 196 also defines a relatively large cavity 202 which opens inwardly towards the extension 189. In each cavity 202, there is pivotally mounted a latch member 203 on a pivot pin 204. The latch member 203 has a right hand portion of reduced thickness which is in the form of a stop 205. The stop 205 is normally seated in an annular recess 206 in the exterior of the sleeve 189, with the recess 206 having a forward edge portion in the form of a shoulder 207 against which the stop 205 engages to also normally prevent movement of the sleeve 195 to the right. It is the latch member 203 which primarily functions to retain the sleeve 195 from moving to the right against the urgence of the springs 200.

The extension 189 is provided with a socket 208 aligned with each of the latch members 203. A ball 209 is seated in each of the sockets 208 and bears against the inner surface of its associated latch member 203. The sockets 208 are so formed wherein the balls 209 thereof are limited in their inwardly movement.

Each of the latch members 203 is provided with an outwardly opening socket 210 in which there is seated a spring 211 and a ball 212, the ball 212 projecting partially from the socket 210 and bearing against the inner surface of the enlargement 196. The spring 211 serves to urge the stop portion 205 of each latch member 203 to a latching position.

Figure 13:
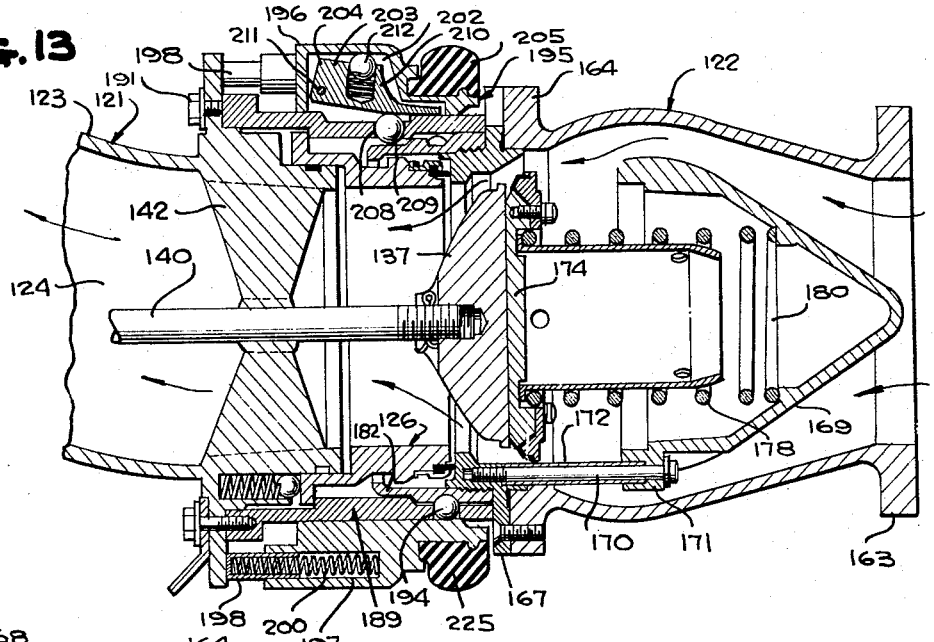
FIGURE 13 is a fragmentary vertical sectional view showing the nozzle and adapter coupled together and with fuel flowing therethrough.

In FIGURE 13, the nozzle 121 is shown assembled with the adapter 122. Further, in the upper portion of this view, the extension 189 and the sleeve 195 are shown rotated approximately 10 degrees so that the details of one of the latches 203 are also shown. Thus, it will be seen that when the nozzle 121 is connected to the adapter 122, the balls 194 are seated in the groove 188 and lock the nozzle 121 to the adapter 122. The sleeve 195 has slid forward under the influence of the springs 200 and the inner surface of the sleeve 195 prevents the balls 194 from moving outwardly out of the recess 188. At this time, the latches 203 play no part in the operation of the device.

In FIGURE 13, the valve member 137 is also illustrated in a partially open position. The valve member 137 has moved to the right from its seated position and has engaged the valve member 174 of the adapter 122 and moved the same from its seated position. It is to be understood that the valve members 137 and 174 will be moved further to the right when the nozzle 121 is operating at its full capacity. At that time, the valve member 174 is substantially seated against the shroud 169. It is also pointed out that although fuel flow is from the adapter 122 to the nozzle 121, the fuel flow may equally as well be from the nozzle 121 to the adapter 122.

In order to facilitate the handling of the nozzle 121, a handle 213 is provided, as is shown in FIGURES 10 and 14. The handle 213 does not extend through a full circle, the handle being interrupted adjacent the top of the nozzle 121. The handle 213 is supported by three brackets 214 which are clamped about the handle 213 in the manner best illustrated in FIGURE 11. Each of the brackets 214 is secured to the flange 192 of the nozzle body 123. The lowermost bracket 214 utilizes one of the bolts 191 which secure the extension 189 to the flange 192. Others of the brackets 214 are secured in place by other bolts 215 also passing through the flange 192.

As is clearly shown in FIGURES 10 and 14, the sleeve 195 is provided with a pair of outwardly directed projections 216. These projections 216 are disposed in transverse alignment. The purpose of the projections 216 is to provide a gripping surface by means of which one may grasp the projections 216 and the handle 213 simultaneously to pull the sleeve 195 to a position wherein the nozzle 121 can be released from the adapter 122.

Reference is now made to FIGURES 10 and 18, wherein it is shown that one of the projections 216 has a fitting 217 secured thereto by means of fasteners 218. A sectional rod 220 which is adjustable in length has one end thereof secured to the fitting 217. The rod 220 is guided adjacent its connection with the fitting 217 by being passed through a projecting ear 221 on the nozzle body 123. The left portion of the rod 220, as viewed in FIGURE 10, is passed through a projecting ear 222 also formed on the nozzle body 123 and is supported thereby. The hub which takes up slack in the span of the film intermediate portion of the crank 153 is provided with a notch 223 in which the end of the rod 220 remote from the fitting 217 may seat. Thus, when the ring 195 is in its normal retracted position, the rod 220 projects into the notch 223 and prevents rotation of the crank 153. On the other hand, when the crank 153 is in a position to hold the valve member 137 in an open position, the rod 220 cannot move as far as is necessary to the left, as viewed in FIGURE 10, to permit the retraction of the sleeve 195 so that the nozzle 121 may be disconnected from the adapter 122. In other words, until such a time as the nozzle 121 is fully connected to the adapter 122, the crank 153 cannot be rotated to move the valve member 137 to an open position, and until such time as the crank has returned to a position moving the valve member 137 to its closed position, the sleeve 195 cannot be retracted to release the nozzle 121 from the adapter 122.

When the nozzle 121 is being coupled to the adapter 122, the extension 189 is initially partially telescoped over the sleeve 182 of the adapter 122. As the extension 189 is further telescoped over the sleeve 182, the balls 194 ride up the cam surface 184 and onto the flat surface 185. On outward movement the balls 194 engage against the rear cam surface 224 of the recessed portion 201 of the sleeve 195 and urge the sleeve 195 slightly to the left. Further, movements of the extension 189 over the sleeve 182 results in the balls 194 riding up the cam surface 186 onto the flat surface 187 wherein the sleeve 195 is further urged to the left. When the sleeve 195 is in this position, the stop portions 205 of the latches 203 are released from the shoulders 207 and may be easily swung outwardly to released positions. As the balls 194 ride up onto the flat portion 187, the balls 209 ride up the cam 184 and urge the latch members 203 to released positions. Then, as the nozzle 121 is further moved into engagement with the adapter 122, the balls 194 drop into the groove 188 to form the desired interlock between the nozzle 121 and the adapter 122. Since the latches 203 are in their released position, as soon as the balls 194 drop into the recess 188, the sleeve 195 slides forward and holds the balls 194 in the recess 188 to prevent accidental disengagement of the nozzle 121 from the adpater 122.

It is pointed out that during this initial interlock of the nozzle 121 with the adapter 122, the sealing ring 134 is disposed closely adjacent to, but spaced from, the ring 165 so that the nozzle 121 may swivel with respect to the adapter 122. However, when it is desired to have fuel flow through the nozzle 121 and the nozzle 121 is in its final position relative to the adapter 122, as the valve member 137 is moved to the right to its open position, the nose 126 is released by the valve member 137 and it is urged to the right by the springs 133 so that the sealing ring 134 is moved into compressive engagement with the ring 165, thereby forming the necessary seal between the nozzle 121 and the adapter 122.

It is to be noted that the sleeve 195 has a resilient ring 225 thereabout. The resilient ring 225 protects the end of the nozzle 121 when it is dropped or laid on the ground. Incidentally, in the event the selector ring 105 is not used in conjunction with the nozzle 21, the sleeve 88 of the nozzle 21 may be provided with a similar resilient bumper ring.

At this time, it is also pointed out that each of the nozzles and adapter may be provided with suitable dust covers to prevent the entrance of foreign matter into the mechanism thereof. These dust covers may be of any simple type and are normally retained on their respective components either by friction or a simple lug type interlock. Also, the dust covers will normally be permanently connected to their respective members by means of chains.

From the foregoing, it will be seen that novel and advantageous provision has been made for carrying out the desired end. However, attention is again directed to the fact that variations may be made in the example apparatus disclosed herein without departing from the spirit and scope of the invention, as defined in the appended claims.

What is claimed as new:

1. In a nozzle and adapter assembly, a nozzle body, an adapter body having a seat thereon, a tubular nose slidable on said nozzle body and forming an extension thereof, said nose having sealing means for engagement with said seat for forming a seal between said nozzle body and said adapter body, resilient means urging said nose to a projected position, a valve member engaged with said nose and closing said nozzle body adjacent said adapter body, cooperating means on said nozzle body and said adapter body interlocking said nozzle body and said adapter body with said sealing means being spaced from said seat and permitting rotation of said nozzle body relative to said adapter body, means carried by said nozzle body connected to said valve member for moving said valve member to an unseated position wherein said nose is released and said sealing means are engaged with said seat, said resilient means including spaced bores in said nozzle body, spring members in said bores, and balls acted upon by said spring members engaging said nose.

2. In a nozzle and adapter assembly, a nozzle body and an adapter body, means for releasably connecting said nozzle body to said adapter body, said means including a nozzle body extension and an adapter body extension disposed in telescoped relation with said nozzle body extension disposed outermost, an annular external groove in the exterior surface of said adapter body extension, a plurality of circumferentially spaced and inwardly directed balls received in said groove and releasably locking said extensions against relative longitudinal movement, a sleeve telescoped over said nozzle body extension for longitudinal movement and engaging said balls to prevent retraction thereof, and cooperating means on said nozzle body extension and said sleeve for locking said sleeve in a retracted telescoped position wherein said balls are free to move outwardly to facilitate the releasing of said nozzle body from said adapter body and the telescoping of said extensions, said cooperating means including a spring loaded latch member secured to and carried by said sleeve and a shoulder on said nozzle body extension, a ball carried by said nozzle body extension and engaging said latch member, and said adapter body extension engaging said last mentioned ball to move said latch member to a released position when said extensions are telescoped.

3. In a nozzle and adapter assembly, a nozzle body and an adapter body, means for releasably connecting said nozzle body to said adapter body, said means including a nozzle body extension and an adapter body extension disposed in telescoped relation with said nozzle body extension disposed outermost, an annular external groove in the exterior surface of said adapter body extension, a plurality of circumferentially spaced and inwardly directed balls received in said groove and releasably locking said extensions against relative longitudinal movement, a sleeve telescoped over said nozzle body extension for longitudinal movement and engaging said balls to prevent retraction thereof, and cooperating means on said nozzle body extension and said sleeve for locking said sleeve in a retracted telescoped position wherein said balls are free to move outwardly to facilitate the releasing of said nozzle body from said adapter body and the telescoping of said extensions, said cooperating means including a spring loaded latch member carried by said sleeve and a shoulder on said nozzle body extension, said sleeve having a cam surface engaged by said balls during the telescoping of said extensions to move said sleeve to a fully retracted position and thereby remove said latch member out of pressure engagement with said shoulder.

4. The assembly of claim 8 together with spring means engaging said sleeve and urging said sleeve to a projected position.

5. In a nozzle and adapter assembly, a nozzle body and an adapter body, means for releasably connecting said nozzle body to said adapter body, said means including a nozzle body extension and an adapter body extension disposed in telescoped relation with said nozzle body extension disposed outermost, an annular external groove in the exterior surface of said adapter body extension, a plurality of circumferentially spaced and inwardly directed balls received in said groove and releasably locking said extensions against relative longitudinal movement, a sleeve telescoped over said nozzle body extension for longitudinal movement and engaging said balls to prevent retraction thereof, cooperating means on said nozzle body extension and said sleeve for locking said sleeve in a retracted telescoped position wherein said balls are free to move outwardly to facilitate the releasing of said nozzle body from said adapter body and the telescoping of said extensions, said nozzle body having a fluid passage therethrough, a valve member closing said fluid passage adjacent said adapter body, mechanism carried by said nozzle body and connected to said valve member for moving said valve member between passage closing and passage opening positions, and stop means carried by said valve engageable with said mechanism for preventing movement of said mechanism to a valve opening position when said sleeve is retracted.

6. The assembly of claim 5 wherein said mechanism includes a crank having a notch therein, and said stop means include a rod having an end engageable in said notch.

7. In a nozzle and adapter assembly, a nozzle body, an adapter body having a seat thereon, a tubular nose slidable on said nozzle body and forming an extension thereof, said nose having sealing means for engagement with said seat for forming a seal between said nozzle body and said adapter body, resilient means urging said nose to a projected position, a valve member engaged with said nose and closing said nozzle body adjacent said adapter body, cooperating means on said nozzle body and said adapter body interlocking said nozzle body and said adapter body with said sealing means being spaced from said seat and permitting rotation of said nozzle body relative to said adapter body, means carried by said nozzle body connected to said valve member for moving said valve member to an unseated position wherein said nose is released and said sealing means are engaged with said seat, selector means for assuring the connection of said nozzle body to the correct adapter body to assure the proper connection to provide the desired liquid, said selector means including a selector ring on said sleeve and a selector ring on said adapter body, a set of aligning sockets on one of said selector rings and a like set of projections on the other of said selector rings for indexing said selector rings relative to each other, means for mounting at least one selector member on one of said selector rings in one of a plurality of preselected positions, the other of said selector rings having a plurality of selector sockets each aligned with one of said preselected positions, and plug means releasably disposed in selector sockets to selectively fill all of said selector sockets except at least one socket which is aligned with said selector member, whereby only nozzles and adapters having complemental selector rings may be joined together.

8. In a nozzle and adapter assembly, selector means for assuring the coupling of a nozzle to a proper adapter, said selector means including a selector ring on said nozzle and a selector ring on said adapter, a set of aligning sockets on one of said selector rings and a like set of projections on the other of said selector rings for indexing said selector rings relative to each other, means for mounting at least one selector member on one of said selector rings in one of a plurality of preselected positions, the other of said selector rings having a plurality of selector sockets each aligned with one of said preselected positions, and plug means releasably disposed in selector sockets to selectively fill all of said selector sockets except at least one socket which is aligned with said selector member, whereby only nozzles and adapters having complemental selector rings may be joined together.

9. The assembly of claim 8 wherein said projections are in the form of bolt heads.

10. The assembly of claim 8 wherein said plugs are in the form of bolts having heads.

11. The assembly of claim 8 wherein said projections and said plugs are in the form of bolt heads.

12. In a nozzle and adapter assembly, a nozzle body and an adapter body, means for releasably connecting said nozzle body to said adapter body, said means including a nozzle body extension and an adatper body extension disposed in telescoped relation with said nozzle body extension disposed outermost, an annular external groove in the exterior surface of said adapter body extension, a plurality of circumferentially spaced and inwardly directed balls received in said groove and releasably locking said extensions against relative longitudinal movement, a sleeve telescoped over said nozzle body extension for longitudinal movement and engaging said balls to prevent retraction thereof, and cooperating means on said nozzle body extension and said sleeve for locking said sleeve in a retracted telescoped position wherein said balls are free to move outwardly to facilitate the releasing of said nozzle body from said adapter body and the telescoping of said extensions, said cooperating means including a leaf spring anchored at one end of said sleeve and a shoulder on said nozzle body extension engageable by said leaf spring.

13. In a nozzle and adapter assembly, a nozzle body and an adapter body, means for releasably connecting said nozzle body to said adapter body, said means including a nozzle body extension and an adapter body extension disposed in telescoped relation with said nozzle body extension disposed outermost, an annular external groove in the exterior surface of said adapter body extension, a plurality of circumferentially spaced and inwardly directed balls received in said groove and releasably locking said extensions against relative longitudinal movement, a sleeve telescoped over said nozzle body extension for longitudinal movement and engaging said balls to prevent retraction thereof, and cooperating means on said nozzle body extension and said sleeve for locking said sleeve in a retracted telescoped position wherein said balls are free to move outwardly to facilitate the releasing of said nozzle body from said adapter body and the telescoping of said extensions, said cooperating means including a spring loaded latch member carried by said sleeve and a shoulder on said nozzle body extension, said latch member being pivotally mounted in said sleeve, and a spring carried by said latch member reacting against said sleeve and urging said latch member towards said nozzle body extension.

14. In a nozzle adapter assembly, a nozzle body, an adapter body having a seat thereon, a tubular nose slidable on said nozzle body and forming an extension thereof, annular abutment means carried by said body engageable with said nose to prevent axial separation of said body and said nose, a valve member engaged with said nose and closing said nozzle body adjacent said adapter body, cooperating means on said nozzle body and said adapter body interlocking said nozzle body and said adapter body with said sealing means being spaced from said seat and permitting rotating of said nozzle body relative to said adapter body, means carried by said nozzle body connected to said valve member for moving said valve member to an unseated position wherein said nose is released and said sealing means are engaged with said seat, and said annular abutment means being effective to prevent the separation of said nozzle body and said nose when said valve member is removed and said nozzle and adapter bodies are disconnected.

15. In a nozzle and adapter assembly, a nozzle body, an adapter body having a seat thereon, a tubular nose slidably and freely rotatably carried by said nozzle body and forming an extension thereof, said nose having sealing means for engagement with said seat for forming a seal between said nozzle body and said adapter body, resilient means urging said nose to a projected position, a valve member engageable with said nose and closing said nozzle body adjacent said adapter, cooperating means between said nozzle body and said valve member for preventing the sliding of said tubular nose on said nozzle body prior to movement of said valve member in a direction to open said nozzle body, means carried by said nozzle body connected to said valve member for moving said valve member to an open unseated position whereby said nose is permitted to slide under the urging of said resilient means, and means for preventing the removal of said nose under the influence of said resilient means when the valve member is removed from said nozzle body.

16. In a nozzle and adapter assembly, a nozzle body, an adapter body having a seat thereon, a tubular nose slidable on said nozzle body and forming an extension thereof, said nose having sealing means for engagement with said seat for forming a seal between said nozzle body and said adapter body, resilient means urging said nose to a projected position, a valve member engaged with said nose and closing said nozzle body adjacent said adapter body, cooperating means on said nozzle body and said adapter body interlocking said nozzle body and said adapter body with said sealing means being spaced from said seat and permitting rotation of said nozzle body relative to said adapter body, means carried by said nozzle body connected to said valve member for moving said valve member to an unseated position wherein said nose is released and said sealing means are engaged with said seat, said tubular nose being freely rotatably mounted relative to said nozzle body, and means for preventing the disassembly of said nose and said nozzle body in any position of relative rotation therebetween.

References Cited by the Examiner
UNITED STATES PATENTS

| | | |
|---|---|---|
| 2,665,926 | 1/1954 | Fraser. |
| 2,866,477 | 12/1958 | Bredtschneider _____ 251—174 |
| 2,946,605 | 7/1960 | Mosher _____ 137—614.03 |
| 3,086,565 | 4/1963 | Mosher _____ 141—384 X |

WILLIAM F. O'DEA, *Primary Examiner.*

MARTIN P. SCHWADRON, *Examiner.*

J. O'NEILL, H. COHN, *Assistant Examiners.*